US006248221B1

(12) United States Patent
Davis et al.

(10) Patent No.: US 6,248,221 B1
(45) Date of Patent: Jun. 19, 2001

(54) ELECTROLYSIS APPARATUS AND ELECTRODES AND ELECTRODE MATERIAL THEREFOR

(76) Inventors: Randolph R. Davis, 44 Redding Ridge Dr., N. Potomac, MD (US) 20878; Thomas F. McGraw, 4801 Lightkeepers Way, #17A, Little River, SC (US) 29566; Richard S. Woll, P.O. Box 52, Delray, WV (US) 26714

( * ) Notice: Subject to any disclaimer, the term of this patent is extended or adjusted under 35 U.S.C. 154(b) by 0 days.

(21) Appl. No.: 09/322,690

(22) Filed: Jun. 1, 1999

Related U.S. Application Data

(62) Division of application No. 08/779,957, filed on Dec. 23, 1996, now abandoned.
(60) Provisional application No. 60/009,257, filed on Dec. 26, 1995.

(51) Int. Cl.[7] .......................................... C25B 9/00
(52) U.S. Cl. ..................... 204/260; 204/262; 204/272; 204/228.1
(58) Field of Search .................................. 204/260, 262, 204/252, 282, 272, 228.1; 429/31, 40, 44

(56) References Cited

U.S. PATENT DOCUMENTS

| | | | |
|---|---|---|---|
| 3,290,522 | 12/1966 | Ginell | 310/3 |
| 3,409,820 | 11/1968 | Burke | 322/2 |
| 3,755,128 | * 8/1973 | Herwig | 204/230 |
| 4,835,433 | 5/1989 | Brown | 310/305 |
| 5,075,160 | 12/1991 | Stinton et al. | 428/282 |
| 5,230,729 | 7/1993 | McCandish et al. | 75/351 |
| 5,273,635 | 12/1993 | Gernert et al. | 204/241 |
| 5,318,675 | 6/1994 | Patterson | 204/86 |
| 5,352,269 | 10/1994 | McCandish et al. | 75/351 |
| 5,366,712 | 11/1994 | Violante et al. | 423/248 |
| 5,395,422 | 3/1995 | Schulz et al. | 75/255 |
| 5,411,654 | 5/1995 | Ahern et al. | 204/242 |
| 5,429,725 | 7/1995 | Thorpe et al. | 204/129 |
| 5,569,561 | 10/1996 | Exnar et al. | 429/218 |

FOREIGN PATENT DOCUMENTS

| | | |
|---|---|---|
| 0 568 118 | 11/1993 | (EP) . |
| 2 231 195 | 1/1993 | (GB) . |
| 62-70203 | 3/1987 | (JP) . |
| WO 90/10935 | 9/1990 | (WO) . |
| WO 90/14669 | 11/1990 | (WO) . |
| WO 95/20816 | 8/1995 | (WO) . |

OTHER PUBLICATIONS

Debra R. Rolison and William E. O'Grady. "Observation of Elemental Anomalies at the surface of Palladium after Electrochemical Loading of Deuterium or Hydrogen," Analytical Chemistry, 63(17), pp. 1697–1702, Sep. 1, 1991, D.W. Mo, Q.S. Cai, L.M. Wang, S.Z.

Brian D. Andresen, Richard Whipple, Armando Alcaraz, Jeffrey S. Haas, and Patrick M. Grant, "Potentially Explosive Organic Reaction Mechanisms in Pd/$D_2O$ Electrochemical Cells," Chemical Health & Safety, 1(3), pp. 44–47, Oct./Nov. 1994.

Y. Arata and Y. Zhang, "Helium ($^{42}$He, $^{32}$He) Within Deuterated Pd–Black," Proceeding of the Japanese Academy, vol. 73(B), No. 1, pp. 1–6 (1997). No month and/or year given.

(List continued on next page.)

Primary Examiner—Kathryn Gorgos
Assistant Examiner—Thomas H Parsons
(74) Attorney, Agent, or Firm—Westerlund & Powell, P.C.; Raymond H. J. Powell, Jr.; Robert A. Westerlund

(57) ABSTRACT

An improved electrolysis system includes a cylindrical anode, a cylindrical cathode, a cathode material including nanocrystalline particles, and an insulator disposed between the anode and the cathode material to prevent contact between the anode and the cathode material.

25 Claims, 7 Drawing Sheets

OTHER PUBLICATIONS

Heinrich Hora, George H. Miley, Jak C. Kelly, and Y. Narne, "Nuclear Shell Magic Numbers Agree With Measured Transmutation By Low–Energy Reactions," ICCF–7, Vancouver, pp. 147–151. No month and/or year given.

D.W. Mo, Q.S. Cai, L.M. Wang, S.Z. Wang, "The Evidence of Nuclear Transmutation Phenomeno in Pd–H System Using NAA (Neutron Activation Analysis)," ICCR–7, Vancouver, pp.259–263. No month and/or year given.

Y. Oya, H. Ogawa, M. Aida, K. Iinuma and M. Okamoto, "Material Conditions to Replicate the Generation of Excess Energy and the Emission of Excess Neutrons," ICCF–7, Vancouver, pp.285–291. No month and/or year given.

Eiichi Yamaguchi and Hiroshi Sugiura. Excess Heat and Nuclear Products from Pd:D/Au Heterostructures by the 'In–vacuo' Method, ICCF–7, Vancouver, pp. 420–424. No month and/or year given.

S. Ueda, K. Yasuda and A. Takahashi, "Study of Excess Heat and Nuclear Products with Closed Electrolysis System and Quadrupole Mass Spectrometer," ICCF–7, Vancouver, pp. 398–402. No month and/or year given.

F. Piantelli, S. Focardi and R. Habel, "Energy Generation and Generator by Means of Anharmonic Stimulated Fusion," International Patent reproduced in Infinite Energy. Sep.–Oct. 1995, pp. 24–31. No month and/or year given.

Ex parte Dash. No. 92–3536, U.S. Patent and Trademark Office Board of Patent Appeals and Interferences, 27 USPQ2d, pp. 1481–1492. No month and/or year given.

H. Hora, "Who's Who in the World", 12th Edition, 1995. No month and/or year given.

A. Takahashi, Biography. No month and/or year given.

E. Yamaguchi, Biography. No month and/or year given.

G. Mengoli et al. "Calorimetry Close to the Boiling Temperature of the $D_2O$/Pd Electrolytic System," Journal of Electroanalytical Chemistry, 444, pp. 155–167, 1998. No month and/or year given.

Martin Fleischmann and Stanley Pons. "Electrochemically Induced Nuclear Fusion of Deuterium," submitted to the Journal of Electroanalytical Chemistry, Mar. 11, 1989.

S. Focardi, R. Habel, and F. Piantelli, Anamalous Heat Production in Ni–H Systems, Il Nuovo Cimento, 107A(1), pp. 163–167, Feb. 1994.

D.P. Stinton, T.M. Besmann, S. Shanmugham, A. Bleier, E. Lara–Curzio, "Development of Osidation/Corrosion–Resistant Composite Materials and Interfaces," Fossile Energy Program Annual Progress Report for Apr. 1994–Mar. 1995, ORNL–6874, pp. 21–33, 1995.

Jellinek, "Theoretical Dynamical Studies of Metal Clusters and Cluster–Ligand Systems," *Metal–Ligand Interactions: Structure and Reactivity*, N. Russo (ed.), Kluwer–Dordrecht, 1995. No month and/or year given.

Talbot A. Chubb and Scott R. Chubb, "Cold Fusion as an Interaction Between Ion Band States," Fusion Technology, 20, pp. 93–99, Aug. 1991.

*Hydrogen in Metals II: Application–Oriented Properties*, G. Alefeld and J. Volkl (ed.), Chapter 7, Springer–Verlag, Berlin, 1978.

S. Srinivasan, "Fuel Cells for Extraterrestrial and Terrestrial Applications," Journal of the Electrochemical Society, 136(2), 41–48C, Feb. 1989.

S.W. Stafford and R.B. McLellan, "The Solubility of Hydrogen in Nickel and Cobalt," Acta Metallurgica. 22, pp. 1463–1468, 1974. No month and/or year given.

Ray E. Kidder, "Energy Transfer Between Charged Particles by Coulomb Collosions," URL–5213, University of California Radiation Laboratory, Livermore, California, May 12, 1958.

A.G. Lipson, DM Sakov, V.B. Kalinin, E.I. Saunin and B.V. Derjaguin, "Observation of Neutrons and Tritium in $Kd_2PO_4$ Single Crystals Upon the Ferroelectric Phase Transition, "Fourth International Conference on Cold Fusion, Dec. 6–9, 1993.

"Energy Loss and Range of Electrons and Protons," National Bureau of Standards Circular 577, 1956. No month and/or year given.

Robert J. LeRoy, Steven G. Chapman, and Frederick R. W. McCourt, "Accurate Thermodynamic Properties of the Six Isotopomers of Diatomic Hydrogen," The Journal of Physical Chemistry, 94(2), pp. 923–929, 1990. No month and/or year given.

D.L. Donohue and Milica Petek, "Isotopic Measurements of Palladium Metal Containing Protium and Deuterium by Glow Discharge Mass Spectrometry," Analy. Chem. 63, p. 740–744, 1991. No month and/or year given.

B. Danapani and M. Fleischman, "Electrolytic Separation Factors on Palladium," Journal of Electrochemistry, 39, pp. 323–332, 1972. No month and/or year given.

*Hydrogen in Metals I: Basic Properties*, G. Alefeld and J. Volkl (ed.), Chapters ;8 and 12, Springer–Verlag, Berlin, 1978. No month and/or year given.

* cited by examiner

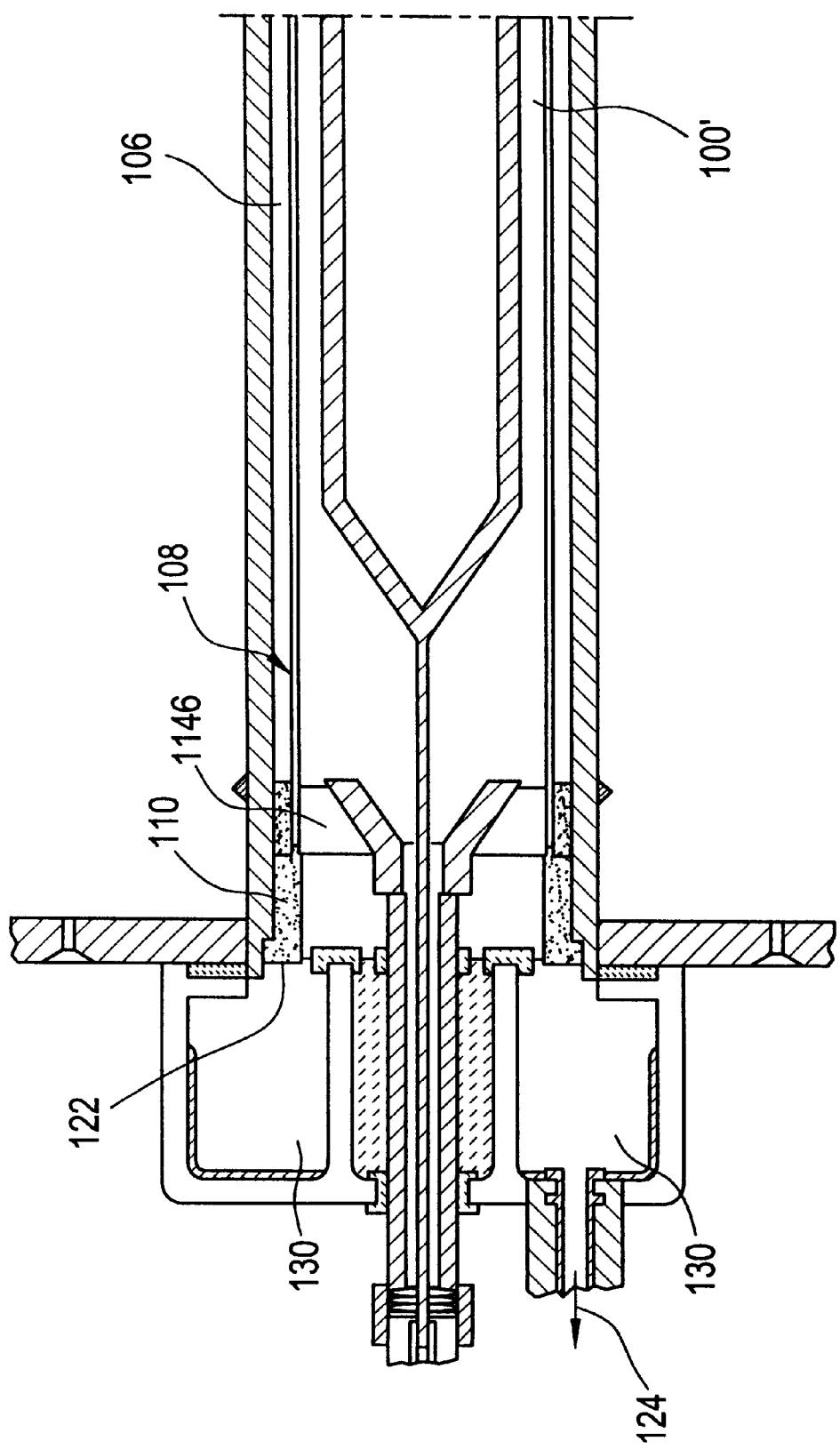

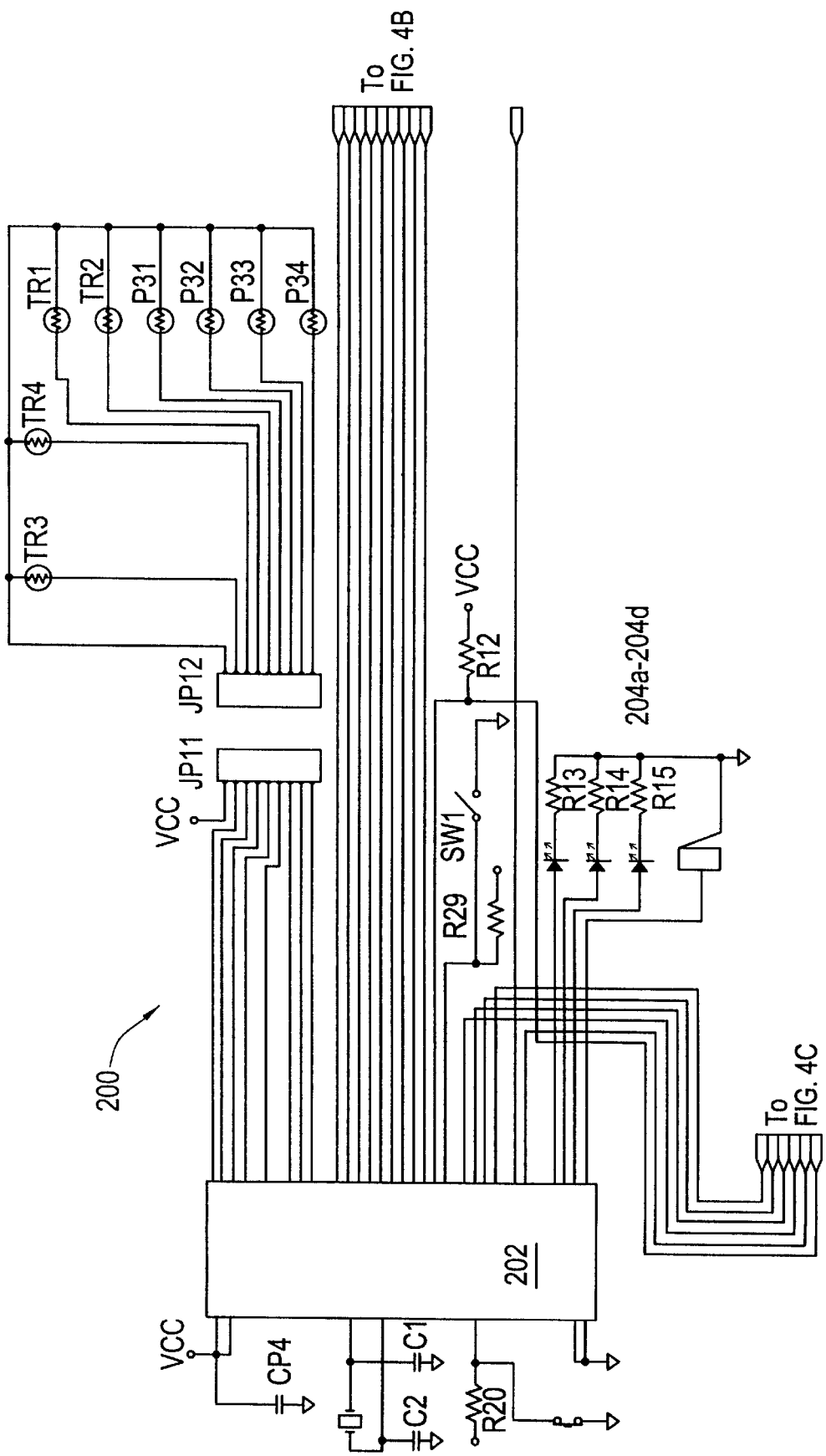

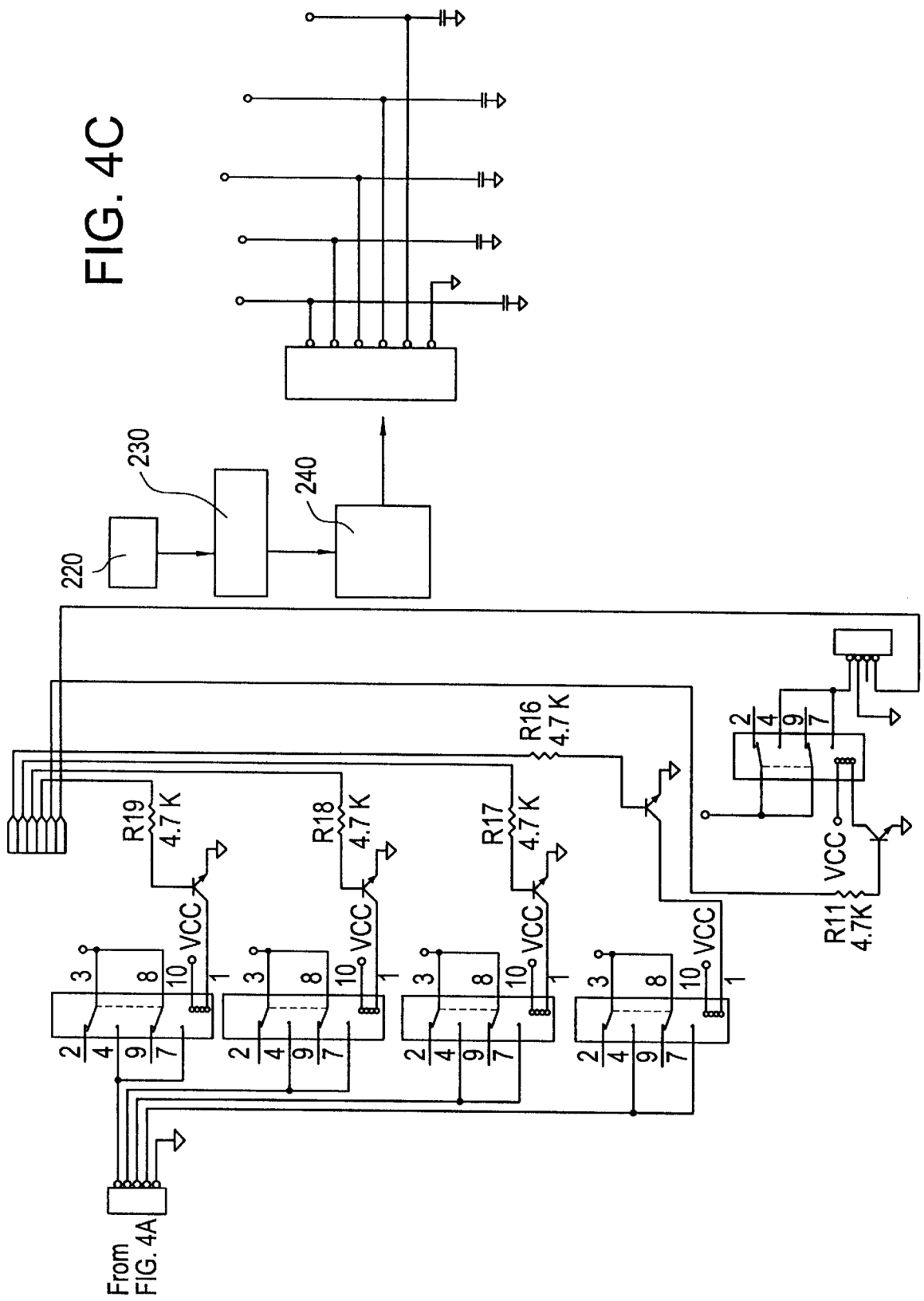

ELECTROLYSIS APPARATUS AND ELECTRODES AND ELECTRODE MATERIAL THEREFOR

This Appln claims the benefit of Provisional No. 60/009,257, filed Dec. 26, 1995, and is a division of Ser. No. 08/779,957 filed Dec. 23, 1996, abandoned.

BACKGROUND OF THE INVENTION

1. Field of the Invention

The present invention relates generally to electrolysis systems. More specifically, the present invention relates to improved materials, structures and methods for improving electrolysis systems.

2. Description of the Related Art

Since 1989, scientists have demonstrated that liquid and gaseous electrolysis processes, though not yet completely understood, may be able to address future heating and electrical power requirements. For example, it has been readily demonstrated that electrolysis of many fluids results in heat generation that can be employed for other purposes, e.g., heating or generation of electricity.

A growing need has developed for compact, reliable, rugged and self-contained power sources providing heat and/or electricity in applications such as mobile vehicles, trailers, and equipment support units. There is a concurrent need for reliable, rugged and self-contained power sources providing heat and/or electricity for larger stationary power requirements. A sense of urgency for such new power sources has resulted from the realization that fossil fuels are in limited supply. It will be appreciated that nuclear fission power plants are not an acceptable alternative due to the dangers associated with uncontrolled releases of fission products and the enormous environmental and political problems associated with waste disposal.

Early attempts to develop the needed energy production apparatus focused on energy production using nuclear batteries. See, for example, U.S. Pat. Nos. 3,290,522; 3,409,820, and 4,835,433, which patents are incorporated herein by reference for all purposes. A radiation source was required, and radiation from this source which was absorbed in a potential barrier, e.g., p-n-p junction or metal-semiconductor contact, gave rise to electron-hole pairs that flowed as electricity due to the beta voltaic or Volta effect. Efficiencies on the order of about 25% were demonstrated.

In their now famous (or infamous) paper, Pons and Fleischmann reported excess heat in heavy water, palladium apparatus. See Martin Fleischmann and Stanley Pons, "Electrochemically Induced Nuclear Fusion of Deuterium," submitted to the Journal of Electroanalytical Chemistry, Mar. 11, 1989. Due to the amount of heat produced per unit volume of cathode material, the energy measured in these types of apparatus has generally been considered to be from a nuclear process. Measurements of helium and tritium produced have given credibility to methods where heat is produced.

Recently, engineered devices based upon these results have been built with the objective of investigating the production of heat and by-products over extended periods of time. For example, U.S. Pat. Nos. 5,273,635 and 5,318,675, which patents are incorporated herein for all purposes, as well as Great Britain Patent No. 2 231 195, EP 0 568 118 and WO95/20816 have been granted for or described such devices, respectively. As a result, problems with the state of the art of methods of liquid and gaseous electrolysis have begun to be addressed by investigators with improved consistency. It will also be appreciated that problems associated with such systems include: hydrogen recombination with oxygen, with the potential for explosion; the relatively slow loading of hydrogen into cathodes; inefficient designs; and, the potential dangers of loaded, pressurized bulk material.

Further developments of and improvements in energy power systems utilizing liquid, plasma or gaseous, i.e., fluid, electrolysis techniques are severely hampered by a lack of:

(1) improved cathode materials;
(2) rugged yet porous reaction vessels;
(3) control circuitry designed to promote and control various aspects of long duration cathode loading and electrolytic cell operation; and
(4) an electronic control circuit to promote and control electric currents produced by nuclear processes similar to those developed by nuclear batteries.

SUMMARY OF THE INVENTION

Based on the above and foregoing, it can be appreciated that there presently exists a need in the art for an improved electrolysis system which overcomes the above-described deficiencies in the pertinent art. The present invention was motivated by a desire to overcome the drawbacks and shortcomings of the presently available technology, and thereby fulfill this need in the art.

An object of the present invention is to provide an electrolysis apparatus which preferably utilizes an improved cathode material. According to one aspect of the present invention, nanocrystalline material made by spray conversion processing advantageously can be used for the cathode reaction material.

Another object of the present invention is to provide an improved reaction vessel for an electrolysis apparatus. According to another aspect of the present invention, an improved reaction vessel advantageously can be constructed for porous, rugged, ceramic matrix composites.

Yet another object of the present invention is to provide an improved electronic control circuit for the improved electrolysis systems which is specifically adapted to control the physical processes associated with long duration electrolysis operations.

According to another aspect of the present invention, the inventive electrolysis apparatus applies to fluid, e.g., liquid, gas, or plasma, electrolysis systems having a cylindrical configuration which utilizes the above-mentioned improved cathode material, porous reaction vessel and application specific electrical control system. It should be mentioned that a cylindrical reaction vessel takes advantage of radial electric fields extending between its walls, thus promoting hydrogen transport in the direction of the reaction material.

These and other objects, features and advantages according to the present invention are provided by a cathode comprising a plurality of nanocrystalline particles formed by spray conversion processing. According to one aspect of the present invention, the nanocystalline particles are formed from a single element selected from the group consisting of Fe, Ni, Cu, Mo, Cr, Co, Mg, Ag, and W. According to another aspect of the present invention, the nanocystalline particles are formed from elements selected from the group consisting of Fe, Ni, Cu, Mo, Cr, Co, Mg, Ag, and W.

These and other objects, features and advantages according to the present invention are provided by an electrolysis apparatus, which includes a cylindrical anode, a cylindrical cathode, a cathode material including nanocrystalline particles, and an insulator disposed between the anode and the cathode material to prevent contact between the anode and the cathode material.

These and other objects, features and advantages according to the present invention are provided by an electrolysis apparatus, including a cylindrical anode, a cylindrical cathode, and a cylindrical, consolidated cathode material including nanocrystalline particles, wherein all of the cylindrical anode, the cylindrical cathode, and the cylindrical, consolidated cathode material are disposed coaxially.

Moreover, the electrolysis apparatus preferably includes a control system for controlling the potential between the anode and the cathode. Advantageously, the control system, which can be employed in a fluid electrolysis apparatus, includes a programmable controller, a power supply, monitoring devices operatively coupled to the programmable controller, and electronic regulators controlled by the programmable controller and receiving power from the power supply for providing electric current and voltage so as to facilitate movement of hydrogen into a reaction volume disposed between the anode and the cathode.

According to one aspect of the present invention, the control system monitors and controls variations in current in the reaction volume under changing temperature, pressure and reaction conditions. According to another aspect of the present invention, the control system detects and equilibrates induced currents across the cathode material produced by reaction products. According to yet another aspect of the present invention, the control system equilibrates induced currents across the reaction volume produced by at least one of positrons and electron capture.

BRIEF DESCRIPTION OF THE DRAWINGS

The preferred embodiments are described with reference to the drawings in which like elements are denoted by like or similar numbers and in which:

FIGS. 4a–4c collectively form a detailed schematic diagram of an electronic control circuit according to the present invention.

DETAILED DESCRIPTION OF THE PREFERRED EMBODIMENTS

Figure 1:
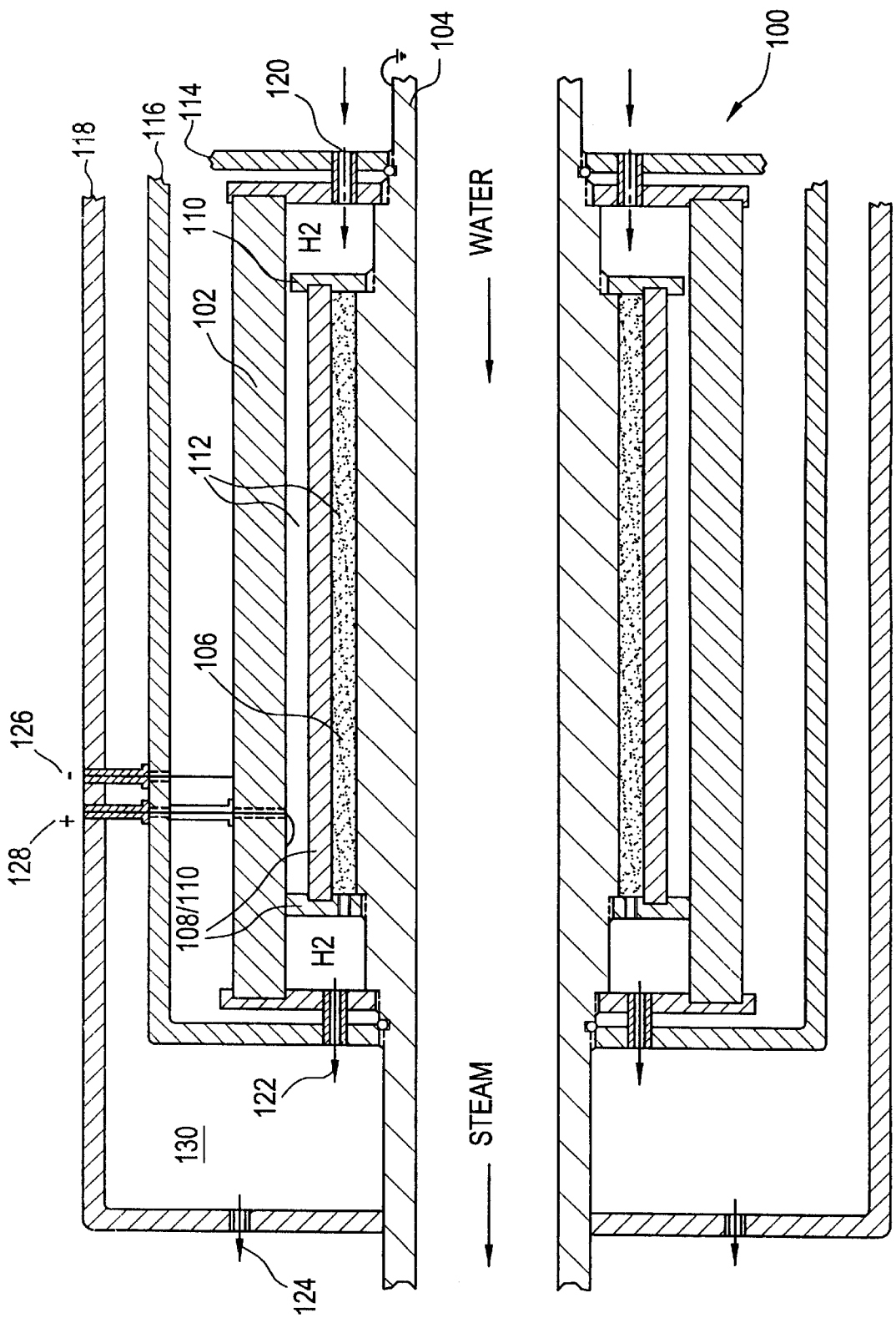
FIG. 1 illustrates a reaction vessel according to the present invention which separates a unconsolidated or consolidated nanocrystalline reaction material from the remaining reaction volume.

The present invention was motivated by a desire to provide improvements to electrolysis systems which will enable such systems to have large power handling capabilities and minimum reaction volumes while being self-regulated for ease of operation. It will be noted that a minimal reaction volume is an important safety aspect of the present invention. The preferred and alternate embodiments of the present invention provide several exemplary designs of apparatuses with incremental power handling capabilities.

It should be mentioned that the present invention includes the use of reaction material manufactured by spray conversion processing (SCP), a method known to those skilled in the art of powder metallurgy. See, for example, U.S. Pat. Nos. 5,230,729 and 5,352,269, which patents are also incorporated herein by reference for all purposes. The reaction material consists of small, micron-sized (e.g., 10–100 microns), spherical particles of metal or metallic compounds, which advantageously can be either unconsolidated or consolidated. Although such materials are available in limited quantities, the use of such materials as the cathode in an electrolysis system has never before been proposed.

It should be mentioned that the SCP particles generally have hollow construction and contain a large number of nanometer-sized grains or reaction sites. It should also be mentioned that particles having a smaller dimension are preferably not utilized due to the danger associated with subnanometer sized particles, which are extremely hazardous. Known hazards include spontaneous combustion; toxicity from inhalation; and the possibility of thermite reactions with other materials. The hazards associated with such materials in general make the choice of cathode material counterintuitive.

Advantageously, the SCP particles provide superior high temperature stability and strength. Moreover, and the process for their manufacture can be varied to produce a variety of metallic compositions, e.g., Fe, Ni, Cu, Mo, Cr, Co, Mg, Ag, W, and combinations thereof. Preferably, the principle constituent of the SCP particles is nickel, although minor amounts of other selected elements can beneficially be incorporated into the reaction material. It should be mentioned that the above-mentioned elements provide a wide variety of possible compositions for the cathode material; all such compositions are considered to be within the scope of the present invention. Moreover, it will be appreciated that one or more compositions will exhibit improved operational characteristics, such as reaction rates and high temperature stability.

It will also be recognized that nickel made by other means will certainly contain some grains or reaction sites. By comparison, particles made by gas atomization, e.g., steel, are generally constrained to a limited size of approximately one micron, which gas phase condensation results in single grain particles.

The nanocrystalline structure of the reaction material advantageously provides a large surface area for dissociation of the fluid-borne hydrogen ($H_2$) into its constituent parts, and a large number of stable grains where material reactions can occur. Gaseous reaction products also have a high escape probability from the reaction material. For example, twenty million ($2.0 \times 10^7$) particles, which occupy approximately 24 $cm^3$ and equates to about 1.4 moles of nickel reaction material with mean diameters of 0.05 mm, advantageously provide an estimated surface area of 0.2 $m^2$ and 'reaction volume' of 0.1 $cm^3$ for the gaseous reaction products. By comparison, cathode surface areas in related liquid electrolysis apparatuses are typically on the order of 0.0001–0.005 $m^2$, with 'reaction volumes' of 0.01–0.04 $cm^3$, as noted in the aforementioned U.S. Pat. No. 5,318,675. The nanocrystals of nickel loaded with hydrogen are stable to sufficiently high temperatures, e.g., >4–500° C. to perform useful work, although this is significantly less than the melting point of the elemental material(s) of which they are composed. The large number of grains helps to ensure that small regions of high temperature (hot spots) are averaged out in the reaction apparatus, which will be discussed in greater detail below.

An investigation of catalytic dissociation of gas molecules has found that dissociation can follow several paths, e.g., direct reactions and the formation of transient states, as discussed in the article by J. Jellinek entitled "Theoretical Dynamical Studies of Metal Clusters and Cluster-Ligand Systems," (*Metal-Ligand Interactions: Structure and Reactivity,* N. Russo (ed.), Kluwer Dordrecht, 1995.). Electric fields, which are extremely strong at the surface of the reaction material, serve to attract these dissociated molecules to the material's surface. Advantageously, some of the hydrogen piles up at the material's surface, then enters the material due to kinetic energy directed along electric field lines. One of the many theoretical reaction mechanisms by which energy can be generated from entrained reaction products suggests that reaction sites should be at least 1000 lattice cells on a side in dimension (0.1 micron). See Talbot A. Chubb and Scott R. Chubb, "Cold Fusion as an Interaction Between Ion Band States," Fusion Technology, 20, pp. 93–99, August 1991. Grains of nanocrystalline reaction material made by spray conversion processing contain approximately this number of lattice cells, and median grain size can be varied over an order of magnitude. Alternatively, the stored gaseous reactant product can be employed in other energy production processes, e.g., "burned" in a fuel cell.

Upon entering the reaction material, hydrogen (as protons) can be considered to dissolve interstitially and somewhat randomly at octahedral sites. The freed electrons may be added to the reaction material or move to the anode of the reaction volume. Transport of hydrogen within the reaction material is treated classically by assuming that metal lattice atoms composing the reaction material are immobile, and that hydrogen is subject to a superposition of electro- and thermo-transport forces. Local heating and cooling, e.g., heating associated with the electrolysis process, as well as the current across the reaction volume, cause the hydrogen to move constantly through the reaction material; thus, a diffusion potential exists even in the absence of an external electric force, as discussed in Chapter 7 of *Hydrogen in Metals II: Application-Oriented Properties,* by G. Alefeld and J. Volkl (ed.), (Springer-Verlag, Berlin, 1978). Detailed information on hydrogen-metal thermodynamic processes can also be found in the text entitled *The Metal-Hydrogen System: Basic Bulk Properties,* by Yuh Fukai (Springer-Verlag, Berlin, 1993).

For this reaction material, enhanced safety against explosion of metallic parts is provided due to the small individual nanoscale reaction volumes of individual metal grains. Components serving the same function as the unconsolidated particles advantageously can be fabricated by pressing and sintering the particles in any manner that will retain their nanocrystalline structure and high porosity.

It should be mentioned that nickel is relatively inexpensive compared with palladium, which is the electrode material of choice used in many other electrolysis apparatuses. While the solubility of hydrogen in nickel is relatively lower at room temperature and one atmosphere pressure (0.005 atom percent) than that of palladium, significant trapping is known to occur at elevated temperature and pressure conditions.

Figure 2B:
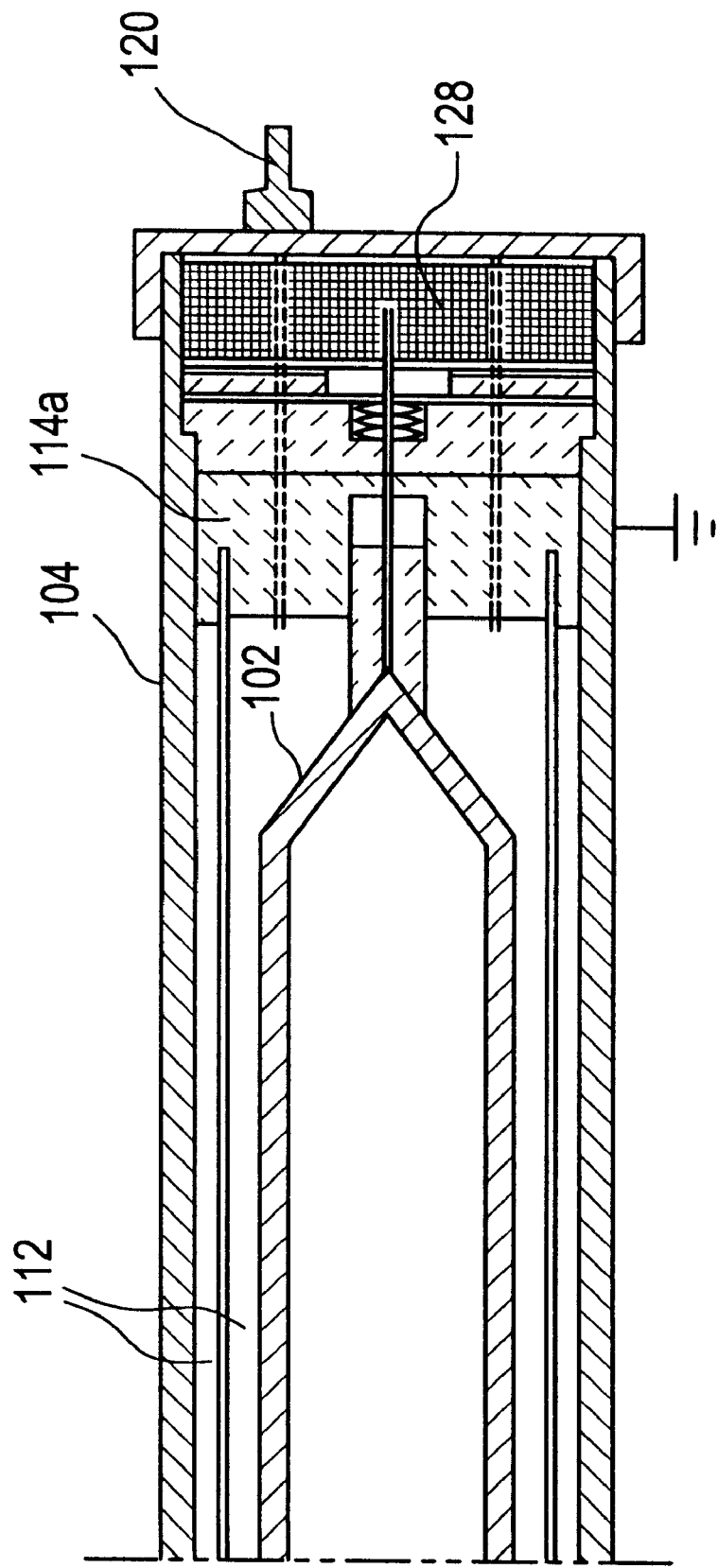
FIG. 2, which includes FIGS. 2a and 2b, collectively illustrates an alternative preferred embodiment according to the present invention wherein a cylindrical reaction vessel is configured with an outer cooling jacket and an adjacent reaction material surrounding an inner anode.
Figure 3:
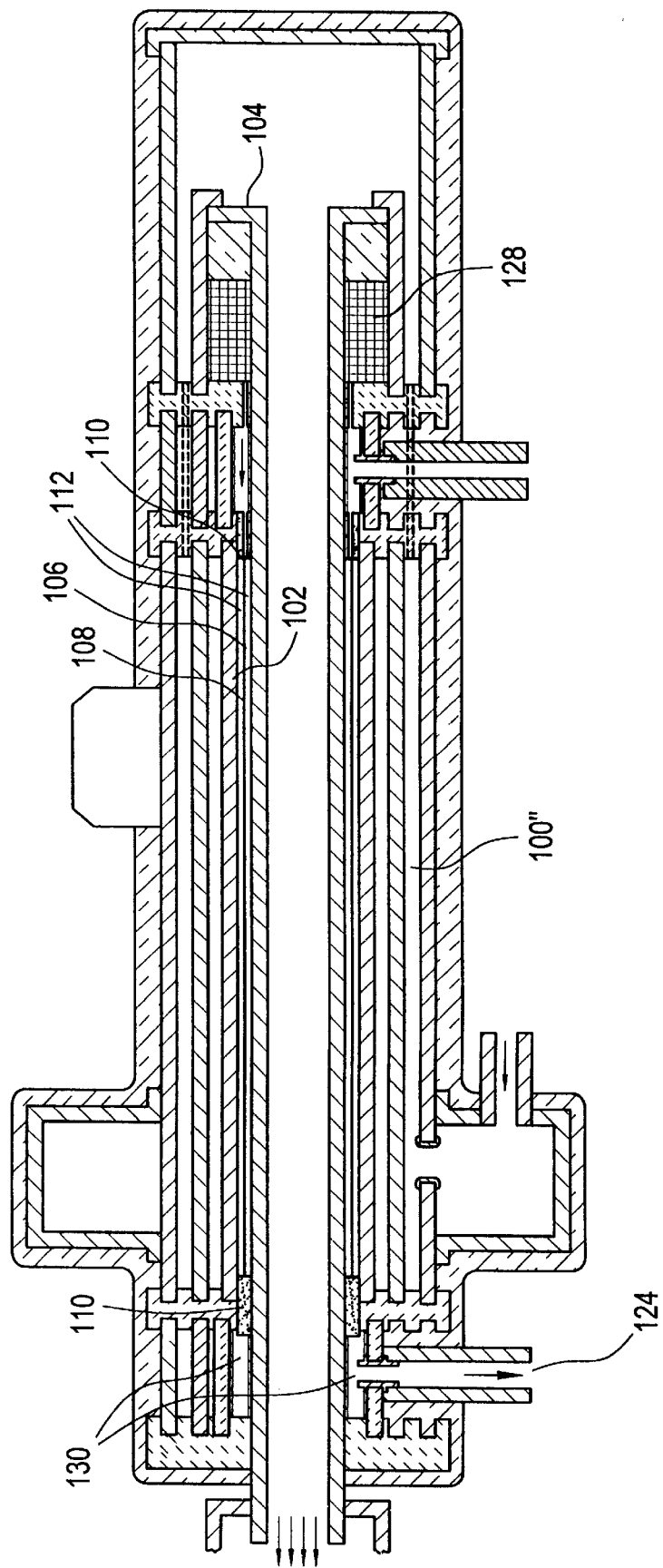
FIG. 3 is an illustration which is helpful in understanding aspects of the compact reaction chamber having a bidirectional cooling pathway and reaction material surrounded by a cylindrical anode.

The particulate reaction material, i.e., either unconsolidated or consolidated nanocrystalline nickel, is disposed within an electrolysis cell apparatus 100, as shown in FIG. 1. Various alternative configurations are illustrated in FIGS. 2 and 3; other variations are expected to occur to those of ordinary skill in the art and are considered to be within the scope of the present invention. The elemental cell 100 includes an anode 102 and a cathode 104, which cathode is electrically connected to the cathode nanocrystalline reaction material 106. Advantageously, the anode 102 and the cathode 104 can be cylindrical members which collectively define an annular space or torus. It should be mentioned that the configuration is exemplary and not a limiting cell geometry.

Preferably, a portion of the annular space between end caps generally denoted 110 forms the reaction volume 112 of the cell 100. The end caps 110 advantageously can be a gas-porous insulating material, which preferably is an insulating ceramic material. In an exemplary case, both end caps are permeable to helium, with at least one of the end caps 110 being permeable to hydrogen gas as well. Between the two end caps 110 is disposed a porous reaction vessel 108 which, in an exemplary case, is a cylindrical reaction vessel. It will be appreciated that the reaction vessel 108 is contained within the reaction volume 112. Advantageously, the reaction vessel can be a porous, rugged, ceramic matrix composite member, which beneficially functions to electrically insulate the cathode reaction material 106 from the anode 102 while permitting hydrogen gas to flow easily up to the surface of the reaction material 106. See FIG. 1. Although hereinafter the discussion of FIGS. 1–3 will assume that influent to the elemental cell 100 is a gas, it should be clearly understood that the influent to the elemental cell 100 is a fluid, i.e., a gas, a liquid, or a plasma.

It will be appreciated that the radius of the reaction vessel 108 can be varied as required to ensure that reaction material is full dispersed along the axis of the cathode 104. Alternatively, the reaction vessel 108 advantageously can be made to contact the anode 102 in several places. For example, in the embodiment depicted in FIG. 1, the anode 102 can be a metal cylinder, which would provide additional support for the reaction vessel 108. Preferably, the internal volume of the reaction vessel is dictated by the volume of the reaction material 106 required to produce the designed power output between projected maintenance periods. Advantageously, the distance between the reaction vessel 108 of the cell 100 and the anode 102 is designed to minimize the volume of free hydrogen gas in the reaction volume 112.

Preferably, the reaction vessel is manufactured as a porous, rugged, ceramic composite, using methods for making braided fabric candle filters and filament-wound continuous fiber ceramic composites (CFCCs), as disclosed in U.S. Pat. No. 5,075,160, which patent is incorporated herein by reference for all purposes, and the paper by D. P. Stinton et al. entitled "Development of Oxidation/Corrosion-Resistant Composite Materials and Interfaces" which was included in the Fossil Energy Program Annual Progress Report for April 1994–March 1995, ORNL-6874, pp. 21–33 (June 1995). The reaction vessel is sufficiently rugged to contain the reaction material, has suitable electrical conductance/resistivity, withstands high temperatures, and advantageously can be manufactured into long, thin cylinders.

Referring specifically to FIG. 1, the reaction vessel 108 serves to confine the unconsolidated or consolidated cathode reaction material 106 to the portion of the reaction volume 112 proximate to the cathode 104. By comparison, it provides a different function than membranes in proton exchange membrane (PEM) fuel cells. See, for example, S. Srinivasan, "Fuel Cells for Extraterrestrial and Terrestrial Applications," Journal of the Electrochemical Society, (136 (2), 41–48C, February 1989) and *National Program Plan-Fuel Cells in Transportation,* DOE Report DOE/CH-93019 (February 1993).

The reaction volume 112 of the cell 100 advantageously can be physically constructed as an elongated bobbin, preferably consisting of a ceramic matrix composite cylinder, i.e., reaction vessel 108 and two ceramic matrix composite end caps 110. It will be appreciated that the end caps 110 beneficially can be either made separate from the reaction vessel 108, whether permanently attached or not, or made as part of the reaction vessel. The cylindrical configuration advantageously provides for a smooth electric field within the reaction volume 112. It will be noted that a precisely controlled electric field distribution is important to efficient operation of the electrolysis cell apparatus 100, i.e., the reaction volume 112, since the electric fields support and promote hydrogen transport in the direction of the reaction material 106, i.e., the nanocrystalline nickel cathode material.

Alternative preferred locations of the reaction vessel of the electrolysis apparatus according to the present invention are illustrated as cells 100' and 100" in FIGS. 2 and 3, respectively. It will be appreciate that the electrode configuration illustrated in FIG. 2 is the reverse of the electrode configurations illustrated in FIGS. 1 and 3. As indicated in FIG. 2, the reaction volume 112 need not be defined by porous end caps 110; the reaction vessel 108 advantageously can be supported by insulating end plates 114a and 114b, one of which is gas permeable. One preferred configuration specifically illustrated in FIG. 2 incorporates a porous end cap 110 as a spacer between cathode 104 and reaction vessel 108.

In each of the alternative preferred embodiments of the present invention depicted in FIGS. 2 and 3, the reaction vessel 108 preferably is constructed using methods similar to those employed in fabricating braided fabric candle filters and filament-wound continuous fiber ceramic composites. Such fabrication techniques are preferred due to the ruggedness, corrosion resistance at high temperatures, high gas permeability and ease of manufacture of the reaction vessel end product; other fabrication techniques advantageously can be employed in constructing the reaction vessel 108.

The reaction vessel 108 advantageously can also be designed with suitable surfaces so as to encapsulate the reaction material 106. Heating the reaction vessel 108 with its enclosed reaction material 106 under vacuum could then be used to drive gases and water vapor out of the reaction material 106. During such operations, the reaction vessel 108 and its reaction material 106 would be secured under vacuum; thus, the completed cell cartridge advantageously could be packaged in an air-tight wrapper for shipment and distribution.

Referring specifically to FIG. 1, it will be noted that the cathode 104 advantageously embodies a steam generator receiving water and discharging steam. With the cell 100' illustrated in FIG. 2, a steam generator or heat exchanger would be disposed surrounding cell 100. Moreover, the cell 100" advantageously can constitute a dual pass device wherein water flowing in a first direction is preheated while water flowing in a second direction is converted into steam. The arrangement illustrated in FIG. 3 beneficially generates useable steam while maintaining the overall cell 100" at a relatively low temperature. It should again be mentioned that the electrolysis process results in heat which advantageously can be removed by coolant, e.g., water, flowing in the heat exchanger.

From FIG. 1, it will be appreciated that reaction fluid, e.g., a gas such as hydrogen, advantageously can be admitted into reaction volume 112 via a first penetration 120 and end cap 110. Moreover, the reactant gas may be exhausted via an exhaust path including end cap 110, a second penetration 122, reaction gas collector 130 and a third penetration 124. It will also be noted that the potential applied to the anode 102 is supplied by a connector 126. Additionally, a waveguide 128 can provide predetermined electromagnetic energy, e.g., microwaves, to the reaction fluid to thereby supply additional excitation.

The rate of hydrogen or hydrogen isotope adsorption into the reaction material 106 depends in a complex manner upon temperature, pressure and electric field strength within the reaction volume 112 and upon the density of reaction sites available, i.e., the 'quality' of the reaction material 106. Preferably, hydrogen gas made by electrolysis of the reaction fluid is utilized for consistent operations.

Figure 4B:
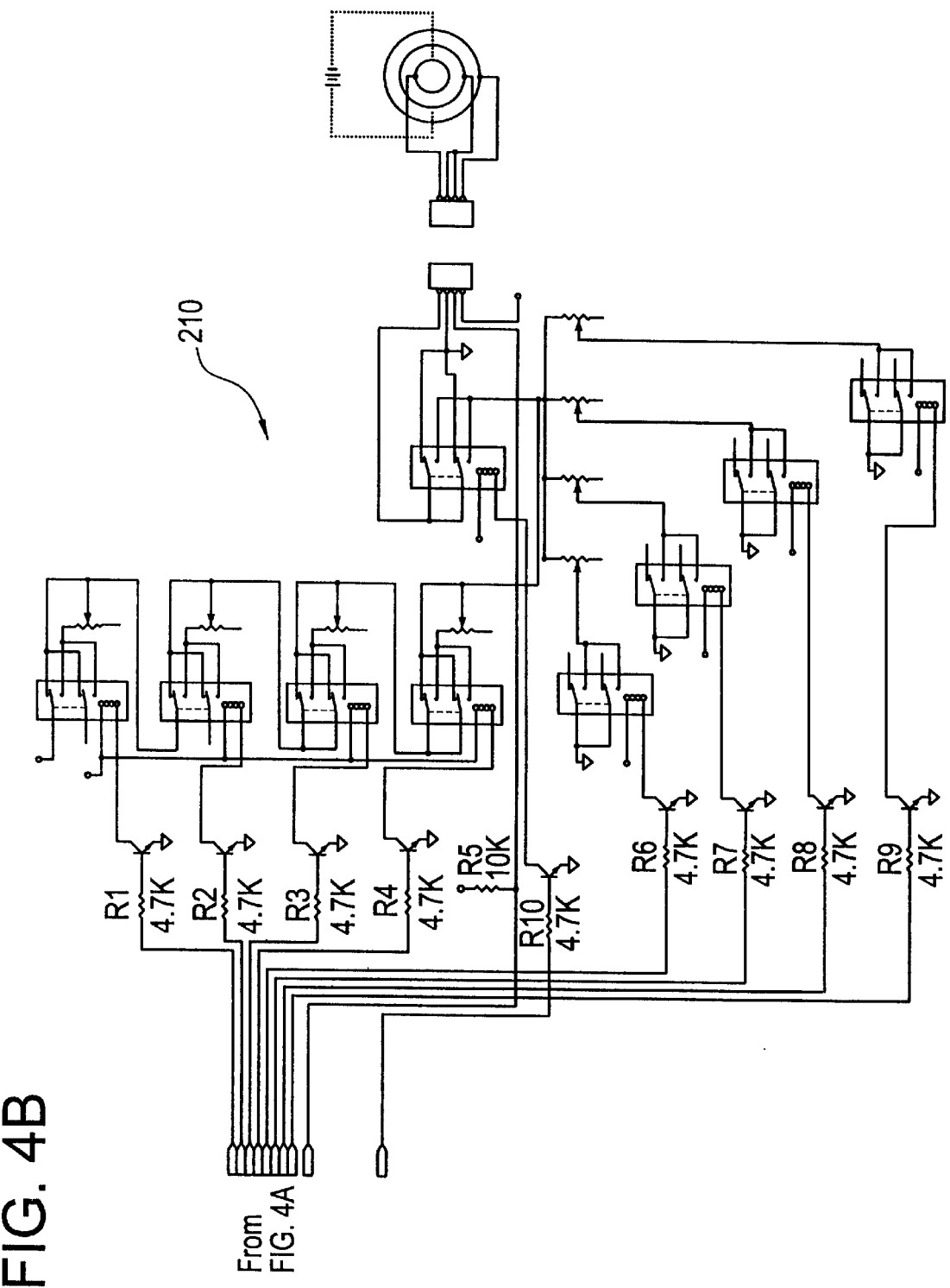

Referring to FIGS. 4a–4c, a specially designed electronic control circuit (ECC) 200 provides electric current to the anode 102 and cathode 104 opposing each other across the reaction volume 112 at the magnitude required as the environment associated with the reaction volume 112 changes with respect to both the cathode reaction material 106 and the reaction vessel 108. The ECC 200 preferably includes a programmable controller 202, current, temperature and pressure sensors operatively connected to the programable controller, electronically-controlled gas and water valves operated by the programmable controller 202, a reaction volume 112 current/voltage source electrically coupled to the programmable controller 202, and a reaction gas collection tube current/voltage source electrically connected to the programmable controller 202. Advantageously, the ECC 200 can also include, in an exemplary case, a backup power source, status indicators, manual override switches, and an outlet connection for a starter/initiator. It will be noted that the electronic control circuit 200 contains electric current, pressure and temperature monitoring components and a connection to a starter/initiator, which is exemplified by waveguide 128 (see FIG. 1), and related electronics, which advantageously can be used to increase the rate of hydrogen adsorption during apparatus operation. Preferably, the starter/initiator operates by irradiating the reactor vessel with electromagnetic radiation in the resonant frequency region of the electromagnetic spectrum for hydrogen for very short predetermined periods of time during.

Preferably, electric current between the anode 102 and the cathode 104 is supplied by electronic control circuit (ECC) 200 illustrated in FIGS. 4a–4c. Advantageously, the ECC 200 includes a programmable controller 202, temperature and pressure sensors TR1–TR4 and PS1–PS4, respectively, operating relays K11–K14 supplying power to electronically-controlled gas and water valves (not shown), a reaction volume 112 current/voltage source 210, which is discussed in greater detail below, a reaction gas collection tube current/voltage source applied to reaction gas collector 130, and a backup power source 230. The ECC 200 advantageously includes electrical connections to the reaction volume 112, status indicators 204a–204d, and manual override switches, i.e., reset switch S1 and kill switch SM1 (See FIG. 4a.). Preferably, a jack (not shown) for facilitating a temporary connection between the programmable controller 202 and a computer-based programmer is also provided.

The ECC 200 advantageously monitors and regulates current (I), temperature (T) and gas pressure (P) across or in the reaction volume 112, respectively, since the concentration of hydrogen protons entering the nanocrystalline reaction material 106 is a function of the above-mentioned variables. It will also be noted that the solubility of hydrogen varies with pressure and temperature, approximately as a function of $\sqrt{p}/(T^{7/4}e^{i/kT})$, where T is absolute temperature and k is the Boltzmann constant. See S. W. Stafford and R. B. McLellan, "The Solubility of Hydrogen in Nickel and Cobalt," Acta Metallurgica, 22, pp. 1463–1468, 1974. By way of comparison, reaction rates in liquid electrolysis with water or heavy water are strongly influenced by the concentration of current enabling electrolytes, such as potassium or lithium carbonate.

The ECC 200 also ensures that current remains across the reaction vessel at all times during operation and maintenance, as the amount of reaction gas in the cathode reaction material will quickly fall off when current is removed.

Monitoring of current, pressure and temperature within the reaction vessel is provided by the programmable controller 202 shown specifically in FIG. 4a, which computes new current/voltage requirements and provides these to the reaction volume's variable power supply 210 as currents, temperatures and pressures change. The programmable controller 202 also recognizes the requirement for additional electric current to be supplied through the cathode of the reaction volume 112 at the correct magnitude to counterbalance variations in conductivity across the reaction volume 112 caused by reaction products collected in reaction gas collector 130, which variations are depicted in FIG. 4b by the phantom potential source coupled to the reaction volume 112. The negative side of the external phantom power supply has an imaginary connection to the anode (+) side of the reaction volume 112, and the positive side of the phantom power supply has an imaginary connection to the cathode 104 (−) of reaction volume 112. The current produce by variable power supply 210, which is discussed in greater detail below, is necessarily increased by the proper amount and rate to counterbalance the reverse current, which is illustrated as being generated by the phantom power supply.

As shown in FIG. 4c, an AC power source 220 is connected to a multiple voltage DC power supply 240 via an uninterruptible power supply 230. Advantageously, power supply 240 generates the need power VCC for operating various devices including programmable controller 202 and transistor switches in variable power supply 210, the DC voltages applied to relays K1–K8 in variable power supply 210, the voltage applied to reaction gas collector 130, the voltage supplying power to the optional igniter, i.e., microwave source, and valve operating voltage.

Preferably, the variable power supply 210 includes relays K1–K4, which advantageously can be operated so as to permit variable resistors VR1–VR4 to be selectively connected in series to anode 102 and relays K5–K8, which can be selectively operated to connect cathode 104 to ground via variable resistors VR6–VR9, which advantageously are operated in parallel. Beneficially, all of relays K1–K8 are operated by respective switches, which, in the exemplary ECC 200 of FIG. 4b, are transistor switches TR1–TR8. It will be appreciated that the variable resistors VR1–VR8 advantageously can be adjusted to accommodate numerous cell 100 operating scenarios.

Advantageously, the loading of hydrogen in the reaction material 106 occurs after hydrogen gas is made to enter the reaction volume and the reaction volume current/voltage is turned on. Current flowing through the apparatus is assumed to be of the form:

$$I(t) A \times \delta(T,p) + B(n_H) \times \Sigma R_n c_n e^{-\lambda n t},$$

where the first term describes variations in conduction $\delta(T,p)$ through the reaction volume related to gas pressure and temperature and the second term describes the equilibrium current necessary to balance reactor products generated in the cathode material 106. Variations in conductivity across the reaction material 106 due to the reaction products, as described by the second term in the equation immediately above, advantageously can be considered to depend upon the time history of reaction products produced in the reaction material 106. It should be mentioned that the magnitude of the current produced by the variable power supply 210 increase in a complex manner as the reaction rate $R_n$ within the cathode material 106 increases and reaction products that are produced, not only with the amount of hydrogen $n_H$ loaded into the cathode material 106.

Energy released in the reaction process ($\delta E/E$) advantageously can be utilized in coulomb (radiationless) interactions between charged particles resulting from the reaction and massive particles composing the reaction material 106, as described by Ray E. Kidder in "Energy Transfer Between Charged Particles by Coulomb Collisions," UCRL-5213, University of California Radiation Laboratory, Livermore, Calif., May 12, 1958, as well as particle-phonon interactions. In the first case, the interaction cross section is directly related to the square of the charges of interacting particles and it is inversely related to the square of the kinetic energy of particles produced. In the quantum approach, charged particles, with wave vector k and momentum hk/2p, and phonons (quanta of energy of the normal modes of vibration) of the crystalline reaction material 106 exert mutual dragging forces on each other, limiting the mean free path length of the particles. See *Phonon Scattering in Condensed Matter V*, by A. C. Anderson and J. P. Wolfe (eds.), (Springer-Verlag, Berlin, 1986) and *Electrons and Phonons: The Theory of Transport Phenomena in Solids* by J. M. Ziman (Oxford, London, 1960). Debye shielding within the local environment of the particles produced is an important factor in the amount of energy transferred. In the classical approach, the necessary condition of positive energy is reasonable with the assumption that the charged particles, e.g., positrons, are viewed by massive particles to be produced instantaneously, and their existence continues until they are annihilated. In the quantum approach, the particles are scattered into a second state k' with the emission of additional phonons. The slowing down process results in low energy, on the order of keV, electromagnetic radiation. The annihilation process results in the production of positronium and energy quanta of several hundred keV. It should be noted that observed effects have been attributed to other explanations as well, to include the turning of crystal domains/reorientation of domain walls as a function of temperature around the Curie temperature, as discussed by A. G. Lipson, D. M. Sakov, V. B. Kalinin, E. I. Saunin and B. V. Derjaguin in their paper "Observation of Neutrons and Tritium in $KD_2PO_4$ Single Crystals Upon the Ferroelectric Phase Transition," which was presented to the Fourth International Conference on Cold Fusion, held Dec. 6–9, 1993.

The manner in which an equilibrium current is provided in response to reaction products produced in the reaction volume 112 takes advantage of concepts known to those skilled in the art of direct charging nuclear batteries, as disclosed in U.S. Pat. Nos. 3,290,522, 3,409,822, and 4,835,433. See also "Isotope Devices Producing Electrical Energy," Seminar on Advanced Energy Sources and Conversion (1958, AD209301). In the batteries of the aforementioned patents and publication, nuclear energy imparted to radioactive decay products during the spontaneous disintegration of radioactive material is converted directly into electricity without relying upon heat production. The resulting apparatuses, which produce electric currents on the order of a few milliamperes, have been used for charging radiation dosimeters, powering watches and clocks, and for other low current applications. By comparison to the present invention, nuclear batteries depend upon the ejection of beta or alpha particles from an emitter towards a collector, where they are intercepted and forced through an external circuit by electrostatic forces of the particles emitted behind them. The emitters must be very thin, and physical supports must be designed to minimize adsorption of beta or alpha particles. No radioactive material is used in the present invention; a comparatively bulky design ensures that reaction products are intercepted within the reaction material 106. Ranges of 0.5–1.5 MeV positrons are between 0.1 and 1 gm/cm$^2$, as noted in "Energy Loss and Range of Electrons and Protons" (National Bureau of Standards Circular 577, 1956).

The programmable controller 202 advantageously can be an off-the-shelf, microprocessor-based circuit designed to automatically maintain safe operation of the reaction system, i.e., electrolysis cell 100. Preferably, the programmable controller 202 employs pre-entered limits on selected operating parameters, for comparison with actual conditions so as to determine compliance and to apply control measures when required. The programmable controller 202 beneficially can be designed to address complex changes in operating parameters, which initially change at near imperceptibly low rates, accelerate sharply to approach constant operating conditions, and then change only slightly during optimum continuous operation of cell 100. Advantageously, automated control functions may be manually over-ridden at any time, to accommodate set-up, change of parameters, periodic maintenance, as well as when required by operational safety considerations. Specific functions of programmable controller 202 include the following:

(1) timed, sequential testing of operating temperatures and pressures, to determine when gas and water adjustments are required;

(2) controlling of voltage and current applied across reaction volume 112, to thereby initiate and sustain the reaction, and, when necessary, terminate reactor operation;

(3) controlling operation of a starter/initiator when provided;

(4) maintaining safe operating pressures and temperatures by periodically monitoring actual pressures and temperatures, and comparing obtained temperature and pressure values with pre-programmed limits; and (5) recognizing decreasing temperatures signaling depletion of the reaction material 106, and the need to replenish the reaction material.

Visible and audible warning signaling, e.g., approach of reaction material depletion, advantageously can be provided, in order to support replenishment of the reaction material 106 and to initiate manual corrections with minimal operational interruptions.

In order to monitor conditions for control purposes, the electronic control circuit 200 includes thermistor-based temperature sensors TS1–TS4 and pressure sensors PS1–PS4, which preferably can be located at pre-selected points (not shown) in the electrolysis cell apparatus 100. For example, selected ones of the temperature sensors TS1–TS4 can be disposed in the input and output water connections, while selected ones of pressure sensors PS1–PS4 advantageously can be disposed upstream and downstream of the reaction gas inlet valve (not shown) and upstream and downstream of the reaction gas outlet valve (not shown). Although these valves are not depicted in FIGS. 1–3, those of ordinary skill in the art can easily ascertain the preferred locations and select an appropriate valve type for the above-mentioned valves; that being the case, further discussion will not be provided in the interest of brevity.

It will be recognized that the thermistor sensors TS1–TS4 advantageously are calibrated resistive devices that reflect temperature changes as changes in resistance, which preferably produces a respective voltage drop across the sensor. Preferably, the programmable controller 202 converts instantaneous analog values such as voltage drops into digital words, and then compares the digital word values with predetermined values which are established for each parameter to be controlled by the programmable controller 202. When a measured value exceeds a corresponding predetermined value, the programmable controller 202 initiates a control sequence so as to attempt to return the corresponding operating parameter to its predetermined value.

Preferably, the programmable controller 202 is designed to maintain reaction material 106 above the Debye temperature of nickel (about 200° C.), where maximum lattice oscillator frequency is reached. It will be appreciated that operation below this temperature, quantum mechanical effects can be effective, and all possible modes of lattice vibration are not excited. Above 200° C., the electrolysis cell apparatus 100 advantageously can be operated consistently. It should also be mentioned that at 300° C., Protium diffusion in nickel occurs at approximately the same rate, i.e., $2.0 \times 10^{-6}$ cm$^2$/sec, as diffusion of deuterium or hydrogen in palladium at 100° C., permitting comparison of the cell 100 with apparatuses operating at lower temperatures. It will be appreciated that this rate is ten times the rate of deuterium or hydrogen diffusion in palladium at room temperature.

Similarly, the pressure sensors PS1–PS4 advantageously can be resistive devices that measure pressure in terms of voltage drop. As previously mentioned, the programmable controller 202 converts the received voltage values into digital values for comparison with predetermined control values. Electrical connections are provided proximate to relays K11–K14 for operating gas and water valves (not shown) so as to permit control of inlet gas valves that limit the amount of hydrogen permitted to enter the reaction volume 112 and outlet gas valves to regulate pressure changes in the reaction volume 112 by "leaking off" gas to the reaction gas collector 130 when pressure within the reaction volume 112 approaches a predetermined maximum operational pressure limit. Pressure preferably is maintained above the atmospheric ambient pressure by means of a gas supply bottle or pressurization pump (not shown). In an exemplary case, the gas valves are welded bonnet valves or the like which will prevent gas and/or reaction products in the cell 100 from being released to the external environment. When pressure is too low within the reaction volume, the gas outlet valve remains closed while the gas inlet valve is opened until pressure in the reaction volume attains the desire operating level.

It will be appreciated that water valves advantageously can be used to regulate system temperature by decreasing or increasing the flow rate of the coolant, thus controlling heat transfer to the water circulating through the electrolysis cell apparatus 100.

Preferably, the hydrogen reaction gas employed in the electrolysis cell apparatus 100 is formed by electrolysis of natural water from underground sources containing all hydrogen isotopes in relatively constant amounts and similar atomic states when compared with variations possible between other methods of manufacture, as discussed by Robert J. LeRoy, Steven G. Chapman, and Frederick R. W. McCourt in "Accurate Thermodynamic Properties of the Six Isotopomers of Diatomic Hydrogen," which article is found in The Journal of Physical Chemistry, 94(2), pp. 923–929 (1990). Hydrogen isotopes have large mass ratios; and, differences exist in their electronic separation factors, diffusion coefficients, and activation energies. See D. L. Donohue and Milica Petek, "Isotopic Measurements of Palladium Metal Containing Protium and Deuterium by Glow Discharge Mass Spectrometry," (Analy. Chem. 63, p.740–744, 1991), B. Danapani and M. Fleischman, "Electrolytic Separation Factors on Palladium," (Journal of Electrochemistry, 39, pp. 323–332,1972), and Chapters 8 and 12 of *Hydrogen in Metals I: Basic Properties,* by G. Alefeld and J. Volkl (ed.), (Springer-Verlag, Berlin, 1978).

Protium is preferentially dissolved into some metals. Inconsistent operation can be expected, therefore, if the reaction gas produced by any number of methods were utilized at various times. Standardized electrochemical and drying techniques, well known to those skilled in the state of the art of hydrogen and deuterium production, should be used in production of the reaction gas.

The exemplary embodiments of FIGS. 2 and 3 each contain a reaction gas collector 130, which is separate from the reaction volume 112; the collector 130 preferably is utilized for collecting reaction gases produced in the reaction volume 112. Reaction gases are made to flow into this volume by positive pressure from the gas inlet side of the reaction volume 112 and by the gettering action of an electrode maintained at very negative voltage with respect to the reaction volume 112, which negative voltage is provided by the electronic control circuit's power supply, as illustrated in FIGS. 4*b* and 4*c*.

It should be mentioned that it is important to maintain sufficient voltage across the reaction volume 112, i.e., between anode 102 and cathode 104, during both power outages and maintenance involving change out of the reaction material 106. It will be noted that the electronic control circuit 200 includes an uninterruptible power supply (UPS) 230 to provide this potential. Preferable; the 200 can be designed to detect power outages, as well as the start of maintenance procedures, and then supply the necessary voltage/current from an internal D.C. supply circuit to the cell 100.

Preferably, the fundamental functions of status indicators 204*a*–204*d* are to indicate if the electronic control circuit 200 is operating properly or requires maintenance, and to indicate whenever the reaction material 106 or gas supply require replacement. A processor reset switch RS advantageously can be incorporated into ECC 200, which switch can be used to reset the programmable controller 202 to the beginning of its cycle, e.g., after replacement of reaction material.

Construction of the alternative preferred embodiments of the present invention illustrated in FIGS. 2 and 3 requires mechanical fabrication of the illustrated metallic and ceramic elements. It will be noted that the volume available for hydrogen is effectively reduced in FIG. 2 by a relatively large, solid (or sealed) cylindrical anode 102. It should be mentioned that the reverse electrical configuration illustrated in FIG. 3 is somewhat more complex in that it consists of approximately 30 metallic and ceramic elements. As discussed previously, cooling water flows from the inlet orifice through a reservoir, a preheat section, a second reservoir, and steam pipe, in that order, until water as steam exits at the outlet of cell 100″. Heat transfer through the wall of the device is retarded by an insulation layer, so that most of the heat produced in the reaction volume 112 is transferred to the cooling water. As indicated previously, these embodiments feature a cylindrical construction to take advantage of radial electric fields extending symmetrically between the metallic walls of the reaction volume 112, i.e., the anode 102 and the cathode 104.

Construction in accordance with the underlying principles of the present invention illustrated in FIGS. 1–3 permit spent reaction material 106 to be removed periodically from the electrolysis cell apparatus 100 (100′ or 100″). Deactivation, or reduction of crystalline reaction volume, can be caused by high temperature material segregation; buildup of reaction products, e.g., aluminum, cobalt, copper, magnesium, manganese, iron, silicon, in the reaction material 106 during operation; physical changes, such as fracture of the crystalline reaction sites produced by hot spots; local melting; and, hydride formation. See the article by Debra R. Rolison and William E. O'Grady entitled "Observation of Elemental Anomalies at the Surface of Palladium after Electrochemical Loading of Deuterium or Hydrogen" in Analytical Chemistry (63(17), pp. 1697–1702, Sep. 1, 1991) and the reference papers by R. A. Brightsen describing "The Nucleon Cluster Model and the Periodic Table of Beta-Stable Nuclides" published by Clustron Sciences Corporation (1994; available via the Internet).

Safety considerations were applied in the design of the cell 100 and in determining the operational and maintenance procedures applicable to the apparatus. It will be noted that explosions have occurred in other electrolysis systems due to hydrogen and hydrocarbon reactions with oxygen, as detailed by Brian D. Andresen, Richard Whipple, Armando Alcaraz, Jeffrey S. Haas, and Patrick M. Grant, in the article entitled "Potentially Explosive Organic Reaction Mechanisms in Pd/$D_2$O Electrochemical Cells," published in Chemical Health & Safety (1(3), pp. 44–47, October/November 1994). As illustrated in the various figures, the preferred embodiments advantageously include a protective jacket 118 to ensure that malfunctions do not affect areas outside of the cell 100. The protective jacket 118 preferably prevents maintenance by untrained persons. Second, the amount of hydrogen permitted in the reaction volume must be limited by the physical size of its active region to values such that chemical reaction with oxygen, water vapor, hydrocarbons (e.g., oil) or other contaminants that may enter the reaction vessel, if any, will not be energetic enough to produce physical damage outside of the cell 100. Additional care is taken during the manufacture and operation of the electrolysis cell apparatus 100 to prevent activities that would cause hydrocarbons to enter the reaction volume 112. Preferably, steps are taken to ensure that the reaction volume 112, reaction vessel 108 and reaction material 106 comply with American National Standards Institute (ANSI) standards for oxygen containing components so as to avoid contamination by materials that are hypergolic with oxygen. Third, the hydrogen reaction gas advantageously is constrained to the reaction volume 112, reaction gas collector 130 and related pathways. Preferably, the reaction volume 112 and related pressure containing components are designed to contain, or otherwise respond to, abnormally high internal pressures that might develop during operation and potential malfunctions. Particular attention was given to joints, welds and strength variations between components.

Safety considerations are also included in the design of the electronic control circuit 200 and its constituent components. The ECC 200 ensures that current cannot be reversed during operation and maintenance and that positive current control is always utilized to prevent rapid outgassing of the reaction vessel 108. A backup (battery) power source is included, preferably for periods when electricity from commercial sources may not be unavailable. The pressure sensing devices PS1–PS4 included in the ECC 200 are utilized at multiple pressure points to detect and respond to unusually high or low pressure conditions. Preferably, relief devices (not shown) are included to control over pressure conditions in reaction volume 112. Visual and audible alarm warnings are also provided to indicate when perturbations exceed established margins for temperature, pressure and other safety parameters. During maintenance, safety precautions must also be used in removing and replacing spent reaction material 106 or reaction vessels 108. Cooling water should be continually circulated through the cell 100 so that the temperature of the reaction volume 112 is permitted to stabilize. Positive current control is continued during all maintenance procedures.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An electrolysis apparatus, comprising:
   a cylindrical anode;
   a cylindrical cathode;
   a cathode material including nanocrystalline particles; and
   an insulator disposed between said anode and said cathode material to prevent contact between said anode and said cathode material.

2. The electrolysis apparatus as recited in claim 1, where said nanocystalline particles are formed from a single element selected from the group consisting of Fe, Ni, Cu, Mo, Cr, Co, Mg, Ag, and W.

3. The electrolysis apparatus as recited in claim 1, where said nanocystalline particles are formed from elements selected from the group consisting of Fe, Ni, Cu, Mo, Cr, Co, Mg, Ag, and W.

4. The electrolysis apparatus as recited in claim 1, wherein said nanocrystalline particles are consolidated nanocrystalline particles.

5. The electrolysis apparatus as recited in claim 1, wherein said insulator comprises a porous ceramic matrix composite reaction vessel having a cylindrical configuration.

6. The electrolysis apparatus as recited in claim 5, wherein said reaction vessel is a gas permeable reaction vessel.

7. The electrolysis apparatus as recited in claim 1, wherein said electrolysis apparatus is a gas electrolysis apparatus and wherein said insulator permits hydrogen to flow into said cathode material.

8. The electrolysis apparatus as recited in claim 1, where said cathode comprises a pipe conducting a fluid for removing heat generated in said cathode material.

9. The electrolysis apparatus as recited in claim 1, wherein said cathode comprises the inner surface of a fluid passage for removing heat generated in said cathode material.

10. The electrolysis apparatus as recited in claim 1, further comprising a control system for controlling the potential between said anode and said cathode.

11. The electrolysis apparatus as recited in claim 10, wherein said electrolysis apparatus is a gas electrolysis apparatus and wherein said control system comprises:
    a programable controller;
    a power supply;
    a plurality of monitoring devices operatively coupled to said programable controller; and
    a plurality of electronic regulators controlled by said programmable controller and receiving power from said power supply for providing electric current and voltage so as to facilitate movement of hydrogen into a reaction volume disposed between said anode and said cathode.

12. The electrolysis apparatus as recited in claim 11, wherein said control system is configured to monitor and control variations in current in said reaction volume under changing temperature, pressure and reaction conditions.

13. The electrolysis apparatus as recited in claim 11, wherein said control system is configured to detect and equilibrate induced currents across said cathode material produced by reaction products.

14. The electrolysis apparatus as recited in claim 11, wherein said control system is configured to equilibrate induced currents across the reaction volume produced by at least one of positrons and electron capture.

15. An electrolysis apparatus, comprising:
    a cylindrical anode;
    a cylindrical cathode; and
    a cylindrical, consolidated cathode material including nanocrystalline particles;
    wherein all of said cylindrical anode, said cylindrical cathode, and said cylindrical, consolidated cathode material are disposed coaxially.

16. The electrolysis apparatus as recited in claim 15, where said nanocystalline particles are formed from a single element selected from the group consisting of Fe, Ni, Cu, Mo, Cr, Co, Mg, Ag, and W.

17. The electrolysis apparatus as recited in claim 15, where said nanocystalline particles are formed from elements selected from the group consisting of Fe, Ni, Cu, Mo, Cr, Co, Mg, Ag, and W.

18. The electrolysis apparatus as recited in claim 15, wherein said nanocrystalline particles are consolidated nanocrystalline particles.

19. The electrolysis apparatus as recited in claim 15, where said cathode comprises a pipe conducting a fluid for removing heat generated in said cathode material.

20. The electrolysis apparatus as recited in claim 15, wherein said cathode comprises the inner surface of a fluid passage for removing heat generated in said cathode material.

21. The electrolysis apparatus as recited in claim 15, further comprising a control system for controlling the potential between said anode and said cathode.

22. The electrolysis apparatus as recited in claim 21, wherein said electrolysis apparatus is a gas electrolysis apparatus and wherein said control system comprises:
    a programable controller;
    a power supply;
    a plurality of monitoring devices operatively coupled to said programable controller; and
    a plurality of electronic regulators controlled by said programmable controller and receiving power from said power supply for providing electric current and voltage so as to facilitate movement of hydrogen into a reaction volume disposed between said anode and said cathode.

23. The electrolysis apparatus as recited in claim 22, wherein said control system is configured to monitor and control variations in current in said reaction volume under changing temperature, pressure and reaction conditions.

24. The electrolysis apparatus as recited in claim 22, wherein said control system is configured to detect and equilibrate induced currents across said cathode material produced by reaction products.

25. The electrolysis apparatus as recited in claim 22, wherein said control system is configured to equilibrate induced currents across the reaction volume produced by at least one of positrons and electron capture.

* * * * *